2,967,110

METHOD OF MANUFACTURING STARCH PRODUCTS

Pieter Johannes Adrianus Beersma and Geert Moes, Hoogezand, Netherlands, assignors to Naamloze Vennootschap W. A. Scholten's Chemische Fabrieken, Groningen, Netherlands, a corporation of the Netherlands No Drawing. Filed Nov. 14, 1955, Ser. No. 546,768

Claims priority, application Netherlands Nov. 16, 1954

16 Claims. (Cl. 106—206)

This invention relates to a method of preparing dry, cold water dispersible starch products from starch or high polymeric starch derivatives. This method consists in that a mixture of starch, which may be modified or unmodified, but which is not gelatinized to an appreciable extent, and water is subjected in the presence of an agent retarding the swelling of the starch granules to the cold swelling starch process as defined hereinafter under such conditions that the dry product obtained when stirred with cold water will give a dispersion of separate, swollen starch granules, all of which or substantially all of which have lost their polarization cross, but not their morphological form.

By the cold swelling starch process we understand a treatment, which consists in that a mixture of starch and water is heated for a very short time at an elevated temperature above the gelatinization point, the mass being pressed out under mechanical pressure into thin layers and simultaneously or immediately thereafter dried. Said treatment is preferably carried out by applying the mixture to rotating drying drums heated to a temperature above the gelatinization point of starch, preferably to a temperature ranging from about 100° to about 180° C., said drums being so arranged, that the mass is pressed out or spread out to a thin layer by mechanical pressure. The material coming from the drums consists of thin films or flakes, which may be ground to the desired flake size.

The agents retarding the swelling of the starch granules belong to one or more of the following groups:

(1) Thickening or binding agents that are soluble in cold water or that are dissolved in water;
(2) Organic liquids, such as cyclohexanol;
(3) Salts of inorganic and organic acids.

The factors that are of importance in the preparation of the products according to the invention, are the nature of the starch or starch derivative used, the amount of water, the nature and amount of the agent retarding the swelling of the starch granules, as well as the temperature and the duration of the heating and drying process. These factors are closely interrelated; when one of the factors is changed, one or more of the other factors should be changed accordingly.

For the method according to the invention we may use in the first place the raw starches e.g. maize, wheat, cassava, potato or sago starch, waxy starches and the like. It is also possible to start from modified, but not yet gelatinized starches, e.g. etherified or esterified starch, thin boiling starch or dextrin. The products according to the invention may also be obtained from starch materials, which in addition to starch contain other substances, e.g. from natural or artificial mixtures of starch or starch derivatives containing protein or protein and cellulose, such as wheat, rye or buckwheat flour, ground cassava or manioc roots and the like. Examples of suitable thickening or binding agents are among others, non degraded or degraded gelatinized starch, starch ethers or esters soluble in cold or warm water, cold swelling starch ethers or esters, cold swelling starches, amylopectin, glucose syrup, water soluble cellulose ethers or esters, water soluble vegetable gums, carob bean gum, sodium alginate, sodium polyacrylate and the like. If the binding agent is not soluble in cold water or does not sufficiently swell therein, it should previously be dissolved in water, because otherwise it will not or not sufficiently be able to perform its function during the short heating and drying process, which is characteristic of the cold swelling starch process. However, products that rapidly and completely dissolve in cold water, such as gum arabic and cold swelling starch ethers and esters as described in British Patent 601,374 are preferred.

The percentage of binding agent added may vary within wide limits and is dependent from the nature and the viscosity of the binding agent and also from the nature of the starch or starch derivative used. The percentage of binding agent may range from about 5% up to more than 100% of the starch.

The preferred percentage of binding agent may easily be determined for each particular case by making some tests.

As examples of the substances according to the groups (2) and (3) we may mention the organic liquids described in Dutch patent specification 68,177, such as hydrogenated cyclic phenols and ketones and aliphatic and aromatic amines, and water soluble sulphates, oxalates, tartrates, salts of higher fatty acids and the like.

The percentage of said substances may also vary within wide limits; it depends on the nature of the agent and the type of starch or starch derivative used.

Generally speaking not so good results are achieved with the substances of the groups (2) and (3) as with the substances of group (1). We therefore preferably use thickening or binding agents for retarding the swelling of the starch granules, whereas the organic liquids and salts are mostly used together with the thickening or binding agents.

According to a preferred embodiment of the invention the modified or unmodified starch, in addition to being subjected to the cold swelling starch process in the presence of water and one or more of the swelling retarding agents mentioned above, is also treated with a slight amount of a polyfunctional agent capable of reacting with at least two hydroxyl groups of the starch.

Examples of suitable polyfunctional agents are: polyfunctional etherifying or esterifying agents, such as glycerol dichlorohydrin, epichlorohydrin, $\beta\beta'$-dichlorodiethylether, butadiene dioxide, phosphorusoxychloride, hexamethylene di-isocyanate and toluene di-isocyanate, synthetic resin precondensates, such as dimethylol urea, dimethylol acetone, trimethylol melamine and aldehydes such as formaldehyde and glyoxal.

The reaction between the starch and the polyfunctional agent may be effected simultaneously with the heating and drying treatment of the mixture of the starch, water and the retarding agent on the heated drum. Preferably, however, the starch is previously treated in non-gelatinized condition with the polyfunctional agent before being subjected in the presence of water and a swelling retarding agent to the drum drying treatment. The treatment with the polyfunctional agent may be effected in known manner both by the wet and by the dry method in the presence of substances which promote the reaction of said agent with the starch.

Said substances may be of an alkaline, neutral or acid nature. The polyfunctional agent to be used may, if desired, be diluted with a solvent and the reaction with the starch may also be carried out in an organic solvent.

Instead of with one polyfunctional agent the starch can also be treated with two or more polyfunctional agents, which may be of the same or of different nature, e.g. an etherifying agent and an esterifying agent. They may be added either simultaneously or successively in any desired sequence, immediately after each other or after a certain lapse of time.

The amounts of the polyfunctional agents to be used are generally very slightly; proportions of 0.1 to a few percent, calculated on the starch or the starch derivative, are already sufficient.

The process according to the invention is preferably carried out by first treating the starch in non-gelatinized condition with such a proportion of a polyfunctional agent that the starch treated is still gelatinizable, whereupon it is subjected in the presence of water and of a cold water soluble binding agent or a binding agent dissolved in water to the cold swelling starch process described hereinbefore. In this application the term "a gelatinizable starch" is used for a product, the granules of which, when heated in water above the gelatinizing temperature, still have the property to swell to such an extent that, at least under mechanical pressure, the granules will disintegrate and, therefore, will lose their morphological form.

The proportion of water used in the cold swelling starch process may vary and is closely related to the nature of the swelling retarding agent used. If this is a thickening or binding agent the percentage of the water, calculated on the unmodified starch, should preferably not exceed 50%. If, however, the starch has been modified with a polyfunctional agent appreciably larger amounts of water can be used.

The cold swelling starch process is preferably carried out in a neutral medium, because for many applications of the products obtained according to the invention, more particularly for the most important application, i.e. the use as a laundry starch, a neutral product is desired. However, in certain cases the cold swelling starch process may also be carried out in an acid or an alkaline medium. It should be taken into account then that generally speaking in an alkaline medium, in contradistinction with an acid medium, the starch granules gelatinize more readily than in a neutral medium.

The products according to the invention swell in cold water and when used in a high concentration they form smooth, stable dispersions of swollen starch granules. In more diluted condition said dispersions will separate into an aqueous upper layer and a bottom layer consisting of separate swollen starch granules, all or substantially all of which have lost the characteristic black polarization cross, but which have retained the morphological form of the original starch granules.

The above mentioned favourable properties of the products obtained are due to the combination of the steps used according to the invention, more particularly to the use of substances retarding the swelling of the starch granules in conjunction with the short heating and drying process, which is characteristic of the cold swelling starch process.

The products according to the invention are of importance for a great number of applications. More particularly the use as a laundry starch should be mentioned, because it has appeared from practical experiments that as laundry starches the products according to the invention have many and particular advantages over the laundry starches conventionally used in the art.

In the first place the new products, owing to their rapid solubility in cold water, may be added in dry condition to the wet laundry to be starched, which entails a considerable saving in labour and time.

Practical tests have shown that generally the products according to the invention, also when used in low concentrations of e.g. 0.5–10 grams per litre, fully disperse in cold water and fall apart into separate granules in a very short time ranging from less than 1 to 10 minutes.

Furthermore the new products have a very high stiffening power so that they can be used in a lower concentration than the conventional laundry starches. A further remarkable property of the new laundry starches is that they are absorbed by the laundry to a large extent and very uniformly, so that after the starching only very little starch is lost with the draining water and during the centrifugation.

Further advantages of the new products when used as a laundry starch are that they substantially do not adhere to the press and dry rapidly, so that very short pressing times are sufficient, which results in a considerably higher output of the ironing department.

The products according to the invention can be used as such or in combination with the conventional additives to laundry starches, such as e.g. borax, pine oil, waxes, paraffin wax, stearin, fatty alcohol sulphates and the like.

Said additives may be incorporated into the laundry starches according to the invention already prior to or during the cold swelling starch process, if desired.

Besides for laundry purposes the products according to the invention may also be used as a finishing and sizing agent, as a printing paste thickening agent in the textile and paper industry, as a paper size, as a binding agent in foodstuffs, as an addition for synthetic resin glues and as an adhesive and binding agent for all kinds of powdered or granular substances.

The invention will be elucidated with reference to the following examples.

*Example I*

To a suspension of 1000 parts by weight of maize starch in 1000 parts by weight of a 0.2 normal caustic soda solution 5 parts by weight of 1.2.3.4-diepoxybutane are added with intensive stirring, whereupon the suspension is agitated for three hours at a temperature of from 40–50° C. After the suspension has been neutralized with a dilute mineral acid a solution of 250 parts by weight of gum arabic in 250 parts by weight of water is added, whereupon the suspension is spread out by means of pressing rollers on a rotating drum heated to a temperature of from 145–150° C. (about 4–5 atmospheres), whereby the layer formed is heated and at the same time dried. The heated drum performs 3–4 revolutions per minute.

The dried product obtained in a layer thickness of about 0.1–0.2 mm. is ground until it passes through a screen having meshes of 4 mm. The product thus obtained is excellently suited to be used as a laundry starch in dry form. If the product is added in a slowly rotating laboratory laundry machine in an amount of 10 grams per litre of water it appears to have already entirely disintegrated into separate swollen starch granules after 2–3 minutes. Under the microscope it appears that said swollen starch granules have all or substantially all lost the polarization cross, but have retained their morphological form.

*Example II*

In a similar manner as in Example I a product is prepared from maize starch pretreated with 1.2.3.4-diepoxybutane, however using 100 parts by weight of a degraded cold swelling starch hydroxy-alkylether as an agent, retarding the swelling of the pretreated maize starch granules. 1 part by weight of the product obtained with 4 parts by weight of cold water gives a viscous, unctuous smooth paste. It possesses the same properties as the product described in Example I and is particularly suited to be used for the same purpose as will be further explained hereafter.

In an open-end laundry machine having a capacity of 23 kg. 400 grams of the product described above are added in dry condition to 90 shirts having a weight of about 23 kg. after the washing and the draining of the last rinsing bath. So much cold water is then added that the ratio of dry matter to liquid amounts to about 1:3½. In the laundry machine, therefore, there are 400 grams of the new laundry starch to about 80 litres of water, which corresponds to a concentration of 5 grams of the product per litre. After a rotating time of 5 minutes the water is drained by opening the draining valve, whereupon the shirts are taken out and centrifuged. The drying time in the press for the shirt fronts was 5½ seconds, while under the same conditions when a conventional boiling starch is used said time would be 7-8 seconds. The effect obtained is very beautiful; the shirts had a full and firm grip and did not feel cracky. On shirts of a dark colour no fogging of the colours or traces of the starch could be found, while there was no question either of a sticking of the shirts to the press, even not after a prolonged use.

Example III 12,000 parts by weight of wheat starch are gradually added to a solution of 3000 parts by weight of a degraded cold swelling starch hydroxyalkyl ether in 6000 parts by weight of water. A tough, viscous mass is obtained, which is heated and simultaneously dried in a thin layer on a rotating drum heated to a temperature of 130-140° C. The drum rotates at 2-3 revolutions per minute.

The dry product is obtained in the form of a film having a thickness of from 0.2-0.5 mm., which is subsequently ground until it passes through a screen having meshes of 1.5 mm.; 1 part by weight of the product thus prepared when dissolved in 4 parts by weight of cold water gives a stable viscous smooth dispersion of separate, swollen wheat starch granules lacking the polarization cross, but having substantially all retained the morphological form. The product obtained is excellently suited to be used as a laundry starch, which will be demonstrated hereinafter with reference to a practical test.

In an open-end laundry machine having a capacity of 23 kg. so much cold water is added to 23 kg. of laboratory or butchers' coats after the washing and after the draining of the last rinsing bath that the ratio of dry matter to liquid amounts to about 1:3½. The laundry machine then contains about 80 litres of water. Subsequently 480 grams of the product described above are added in dry form, whereupon the machine is started. After a rotation of about 2 minutes it appears that the product is fully dispersed. After a rotation of 5 minutes the water is discharged by opening the draining valve, whereupon the laundry is taken out and subsequently centrifuged. The laundry is then pressed on a twin coat press at a steam pressure of 6 atmospheres. A very beautiful stiff and smooth effect was obtained without the coats being cracky.

The laundry did not stick to the press and the drying times were shorter than those required in case the conventional starches are used, which have to be previously boiled with water and introduced into the laundry machine in dissolved condition.

Example IV

To a solution of 250 parts by weight of a degraded cold swelling starch hydroxyalkyl ether in 750 parts by weight of water a solution of 125 parts by weight of anhydrous sodium sulphate in 500 parts by weight of water is added. Subsequently 1000 parts by weight of maize starch are dispersed in this mixture, whereupon the suspension is heated in a thin layer on a rotating drum heated to a temperature of from 140-150° C., and immediately thereafter dried, the dry product being subsequently ground. The heated drum performs about 4 revolutions per minutes, while the thickness of the film obtained is 0.2-0.3 mm.

1 part by weight of the product thus obtained together with 4 parts by weight of cold water will give a smooth, unctuous, viscous dispersion of swollen granules of maize starch. Upon an examination in polarized light between crossed nicols it appears that the major portion of the swollen starch granules no longer shows the black cross.

Example V 1000 parts by weight of cassava starch are intimately mixed with 100 parts by weight of cyclohexanol, whereupon the mixture is dispersed in a solution of 100 parts by weight of a cold swelling starch hydroxyalkyl ether in 500 parts by weight of water. The dispersion thus obtained is spread out in a thin layer on a drum heated to a temperature of from 120-130° C., performing about 5 revolutions per minute, the mass being heated and simultaneously dried. The dry product is obtained in the form of a film having a thickness of from 0.2-0.3 mm., which is subsequently ground.

1 part by weight of the product thus obtained with 3-4 parts by weight of cold water gives a medium viscous, smooth paste. Upon examination of the paste under the microscope it appears that the major portion of the cassava starch granules lack the characteristic polarization cross, but have retained their morphological form.

When introduced into a slowly rotatable laboratory laundry machine in an amount of 10 grams per litre the product after a few minutes' rotation is entirely disintegrated into separate, swollen starch granules having the above mentioned properties.

Example VI 1000 parts by weight of potato starch are dispersed in 1000 parts by weight of a 0.15 normal caustic soda solution, whereupon 20 parts by weight of epichlorohydrin are slowly added with stirring. The suspension is subsequently stirred for three hours at a temperature of from 25-30° C. When the reaction is completed the alkali is neutralized with a dilute mineral acid, whereupon 1000 parts by weight of a 5% solution of Colloresin LV (a commercial, low viscous carboxymethylcellulose) are added. The suspension thus obtained is subsequently heated to a temperature of from 65-70° C. for such a time that the major portion of the starch granules has lost the polarization cross. The mass is then spread out in a thin layer on a drum heated to a temperature of from 130-140° C., the layer formed being heated and simultaneously dried. The heated drum performs about 5 revolutions per minute. The dry product obtained in a film with a thickness of from 0.1-0.2 mm. is ground until it can pass through a screen having meshes of 2.5 mm.

If 1 part by weight of the product thus obtained is dispersed in 4 parts by weight of cold water, a viscous dispersion of swollen potato starch granules is obtained, which upon further dilution disintegrates into separate starch granules. When examined in polarized light between crossed nicols it appears that all the grains have lost the cross, but that the major portion has retained the morphological form.

Example VII 6 parts by weight of phosphorus oxychloride are added with energetic stirring to a suspension of 2000 parts by weight of cassava starch in 3000 parts by weight of a 0.15 normal caustic soda solution. The suspension is stirred for half an hour at room temperature, whereupon the concentration of the caustic soda solution is increased to 0.2 normal. While the temperature is raised to 35-40° C. 150 parts by weight of ethylene oxide are introduced into the suspension in the course of three hours. After the addition of the ethylene oxide the suspension is stirred for another three hours at the same temperature (35-40° C.).

After the suspension has been neutralized with dilute hydrochloric acid 600 parts by weight of a low viscous cold swelling starch hydroxyalkyl ether are dissolved in the suspension and the mixture is subsequently pressed out into a thin layer and dried on a rotating drum heated to a temperature of about 150° C. The drum makes about 4 revolutions per minute. The dry product obtained with a film thickness of from 0.1–0.2 mm. is ground until it passes through a screen having meshes of 2.5 mm. If 1 part by weight of the product thus prepared is dispersed in 50 parts by weight of water of room temperature, it disintegrates into separate swollen granules of cassava starch in about 5 minutes, said granules when examined in polarized light between crossed nicols substantially all lack the polarization cross, but have retained their morphological form.

Owing to the rapid disintegration into separate swollen granules when mixed with water the product is particularly suited to be used as a laundry starch which can be added in dry form.

We claim:

1. A dry cold water dispersible starch product in the form of thin flakes having a thickness of approximately 0.1–0.5 mm. consisting of swollen but not yet disintegrated starch granules, cemented together by between 5 and 100% of a binding agent of the group consisting of gelatinized starches, water soluble starch esters, water soluble starch ethers, amylopectin, glucose syrup, water soluble cellulose ethers, water soluble cellulose esters, water soluble vegetable gums, sodium alginate and sodium polyacrylate, said starch product when stirred with cold water being immediately disintegrated into separate swollen starch granules which have lost their polarization crosses.

2. A starch material according to claim 1 in which the starch material is corn starch and the binding agent gum arabic.

3. A dry cold water dispersible starch product according to claim 1, in which the swollen but not yet disintegrated starch granules consist of a reaction product of the starch material with a polyfunctional agent, in which the polyfunctional agent has reacted with at least 2 hydroxyl groups of the starch molecules.

4. A process of manufacturing a dry starch product which partially swells when mixed with cold water comprising heating and simultaneously drying a mixture of 100 parts by weight of a gelatinizable starch material in ungelatinized condition with not more than 50 parts by weight of water and between 5 and 100 parts by weight of a binding agent from the group consisting of gelatinized starches, water soluble starch ethers, water soluble starch esters, amylopectin, glucose syrup, water soluble cellulose ethers, water soluble cellulose esters, water soluble vegetable gums, sodium alginate and sodium polyacrylate to a temperature above the gelatinizing point but not exceeding 180° C. in the form of a layer which after drying has a thickness of approximately 0.1–0.5 mm., said heating and drying treatment being sufficient to distend substantially all starch granules until their polarization crosses have disappeared and to cement the starch granules together to a film, said film being then comminuted to small flakes, so that when stirred with cold water, said flakes will immediately disintegrate into separate swollen starch granules.

5. A process according to claim 4 in which the starch is potato starch.

6. A process according to claim 4 in which the starch material is corn starch.

7. A process according to claim 4 in which the starch material is wheat starch.

8. A process according to claim 4 in which said binding agent is gum arabic.

9. A process according to claim 4 in which said binding agent is a cold swelling starch ether.

10. A process according to claim 4 in which said binding agent is a cold swelling starch ester.

11. A process according to claim 4 in which said binding agent is amylopectine.

12. A process according to claim 4 in which said binding agent is carboxymethyl cellulose.

13. A process according to claim 4 in which said binding agent is sodium polyacrylate.

14. A process according to claim 4 in which a salt selected from the group consisting of water soluble sulphates, oxalates, tartrates and salts of higher fatty acids is added.

15. A process according to claim 4 in which an organic liquid selected from the group consisting of hydrogenated cyclic phenols, hydrogenated cyclic ketones, aliphatic amines and aromatic amines is added.

16. A process of manufacturing a dry starch product which partially swells when mixed with cold water, comprising reacting a gelatinizable starch material with a polyfunctional agent capable of reacting with at least two hydroxyl groups of the starch, so as to produce a modified starch which is not substantially gelatinized but is still gelatinizable and heating and simultaneously drying a mixture of 100 parts by weight of said modified starch with water and between 5 and 100% of a binding agent from the group consisting of gelatinized starches, water soluble starch ethers, water soluble starch esters amylopectin, glucose syrup, water soluble cellulose ethers, water soluble cellulose esters, water soluble vegetable gums, sodium alginate and sodium polyacrylate, to a temperature above the gelatinizing point but not exceeding 180° C. in the form of a layer which after drying has a thickness of approximately 0.1–0.5 mm., said heating and drying treatment being sufficient to distend substantially all starch granules until their polarization crosses have disappeared and to cement the starch granules together to a film, said film being then comminuted to small flakes so that when stirred with cold water, said flakes will immediately disintegrate into separate swollen starch granules.

References Cited in the file of this patent

UNITED STATES PATENTS

| Re. 23,443 | Lolkema | Dec. 18, 1951 |
| 1,677,348 | Kantorowicz | July 17, 1928 |
| 1,773,056 | Meyer | Aug. 12, 1930 |
| 2,121,502 | Kesler | June 21, 1938 |
| 2,147,104 | Moller | Feb. 14, 1939 |
| 2,500,950 | Konigsberg | Mar. 21, 1950 |
| 2,516,634 | Kesler et al. | July 25, 1950 |
| 2,541,773 | Lolkema et al. | Feb. 13, 1951 |
| 2,563,661 | Rood | Aug. 7, 1951 |

FOREIGN PATENTS

| 526,643 | Great Britain | Sept. 23, 1940 |

OTHER REFERENCES

Gregory: "Uses and Applications of Chemicals and Related Materials" (1939), Reinhold Publishing Corp. (page 486.)